(12) United States Patent
Kato

(10) Patent No.: US 10,507,999 B2
(45) Date of Patent: Dec. 17, 2019

(54) MANUFACTURING METHOD OF TANK AND TANK MANUFACTURING APPARATUS

(71) Applicant: TOYOTA JIDOSHA KABUSHIKI KAISHA, Toyota-shi, Aichi-ken (JP)

(72) Inventor: Kei Kato, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 239 days.

(21) Appl. No.: 15/152,836

(22) Filed: May 12, 2016

(65) Prior Publication Data
US 2016/0339632 A1    Nov. 24, 2016

(30) Foreign Application Priority Data

May 20, 2015    (JP) ................................. 2015-102858

(51) Int. Cl.
*B29C 70/32*    (2006.01)
*B65H 54/10*    (2006.01)
(Continued)

(52) U.S. Cl.
CPC ............. *B65H 54/10* (2013.01); *B29C 35/16* (2013.01); *B29C 53/602* (2013.01); *B29C 53/62* (2013.01); *B29C 53/845* (2013.01); *B29C 70/32* (2013.01); *F17C 1/06* (2013.01); *F17C 1/16* (2013.01); *B29C 53/562* (2013.01);
(Continued)

(58) Field of Classification Search
None
See application file for complete search history.

(56) References Cited

U.S. PATENT DOCUMENTS 3,189,510 A * 6/1965 Eldred ................... B21D 51/24
428/114
3,715,252 A * 2/1973 Fairbairn .............. B29C 53/582
118/107
(Continued)

FOREIGN PATENT DOCUMENTS

DE         1139138 B     11/1962
DE    102011082192 A1    3/2013
(Continued)

OTHER PUBLICATIONS

Machine Translation of PCT WO 2008/046878, Date Unknown.*
Machine Translation of PCT WO 2008/046879, Date Unknown.*

*Primary Examiner* — Jeffry H Aftergut
(74) *Attorney, Agent, or Firm* — Finnegan, Henderson, Farabow, Garrett & Dunner, LLP

(57) ABSTRACT

There is provided a manufacturing method of a tank. The manufacturing method comprises a cooling process of cooling down a resin-adhering fiber bundle that has a resin adhering to a fiber bundle; and a winding process of winding the resin-adhering fiber bundle that is cooled down by the cooling process, on a rotating liner. The cooling process cools down the resin-adhering fiber bundle to make a temperature of the resin-adhering fiber bundle that is being wound on the liner in the winding process, equal to or lower than a set temperature which is set in advance as a temperature to provide a viscosity of the resin that prevents the resin from being splashed from the resin-adhering fiber bundle by rotation of the liner in a course of winding the resin-adhering fiber bundle on the liner.

13 Claims, 6 Drawing Sheets

(51) Int. Cl.
 *F17C 1/16* (2006.01)
 *B29C 35/16* (2006.01)
 *B29C 53/60* (2006.01)
 *B29C 53/62* (2006.01)
 *B29C 53/84* (2006.01)
 *F17C 1/06* (2006.01)
 *B29L 31/00* (2006.01)
 *B29C 53/56* (2006.01)

(52) U.S. Cl.
 CPC ............ *B29C 2035/1616* (2013.01); *B29L 2031/7156* (2013.01); *B29L 2031/7172* (2013.01); *F17C 2201/0109* (2013.01); *F17C 2203/0604* (2013.01); *F17C 2203/0619* (2013.01); *F17C 2203/0663* (2013.01)

(56) References Cited

U.S. PATENT DOCUMENTS

| | | | | |
|---|---|---|---|---|
| 4,531,354 | A | * | 7/1985 | Zentner ............ C08G 59/18 428/367 |
| 5,037,284 | A | * | 8/1991 | Angell, Jr. ........ B29B 15/122 264/135 |
| 5,698,066 | A | * | 12/1997 | Johnson ............ B29C 53/8016 156/353 |
| 6,096,164 | A | * | 8/2000 | Benson ............ B29C 53/602 156/425 |
| 6,228,474 | B1 | * | 5/2001 | Kishi ............ B29B 15/122 428/297.4 |
| 6,752,190 | B1 | * | 6/2004 | Boll ............ B29B 15/08 156/173 |
| 2006/0096993 | A1 | * | 5/2006 | Takashima ............ F17C 1/06 220/588 |
| 2006/0177591 | A1 | * | 8/2006 | Raday ............ B29B 15/122 427/430.1 |
| 2009/0236091 | A1 | | 9/2009 | Hammami et al. |
| 2014/0167333 | A1 | * | 6/2014 | Jordan ............ C09D 175/16 264/496 |

FOREIGN PATENT DOCUMENTS

| | | |
|---|---|---|
| JP | 7-205313 | 8/1995 |
| JP | H-07205316 A | 8/1995 |
| JP | H-08103967 A | 4/1996 |
| JP | 2008-290308 | 12/2008 |
| JP | 2014-156015 | 8/2014 |
| JP | 2015-093448 A | 5/2015 |
| WO | WO-2008/046878 A1 * | 4/2008 |
| WO | WO-2008/046879 A1 * | 4/2008 |

* cited by examiner

MANUFACTURING METHOD OF TANK AND TANK MANUFACTURING APPARATUS

CROSS-REFERENCE TO RELATED APPLICATIONS

The present application claims priority from Japanese patent application No. 2015-102858 filed on May 20, 2015, the content of which is hereby incorporated by reference into this application.

BACKGROUND

Field

The present invention relates to a manufacturing method of a tank and a tank manufacturing apparatus.

Related Art

A known manufacturing method employs a filament winding method (hereinafter simply referred to as "FW method") to manufacture a high-pressure tank used for a natural gas vehicle or a fuel cell vehicle (see, for example, JP 2014-156015A). The manufacturing method of the high-pressure tank by the FW method winds a reinforced fiber bundle that is impregnated with a thermosetting resin such as an epoxy resin, on the outer circumference of a liner and heats and cures the thermosetting resin to form a fiber-reinforced resin layer.

There is, however, a possibility that the resin adhering to the fiber bundle that is being wound on the rotating liner is splashed by the centrifugal force in the course of winding the fiber bundle impregnated with the resin on the outer circumference of the liner. In general, the fiber bundle that is to be wound on the outer circumference of the liner has the temperature increased by the friction of the fiber bundle against a joint roller, before being wound on the liner. Increasing the temperature leads to decreasing the viscosity of the resin included in the fiber bundle and makes the resin likely to be splashed in the course of winding the fiber bundle on the outer circumference of the liner.

SUMMARY

In order to solve at least part of the above problems, the invention may be implemented by any of the following aspects.

(1) According to one aspect of the invention, there is provided a manufacturing method of a tank. The manufacturing method comprises a cooling process of cooling down a resin-adhering fiber bundle that has a resin adhering to a fiber bundle; and a winding process of winding the resin-adhering fiber bundle that is cooled down by the cooling process, on a rotating liner. The cooling process cools down the resin-adhering fiber bundle to make a temperature of the resin-adhering fiber bundle that is being wound on the liner in the winding process, equal to or lower than a set temperature which is set in advance as a temperature to provide a viscosity of the resin that prevents the resin from being splashed from the resin-adhering fiber bundle by rotation of the liner in a course of winding the resin-adhering fiber bundle on the liner.

In the manufacturing method of this aspect, the resin adhering to the resin-adhering fiber bundle that is to be wound on the liner is cooled down in the cooling process to have the viscosity increased to the level that prevents the resin from being splashed by rotation of the liner. This configuration suppresses the resin adhering to the resin-adhering fiber bundle from being splashed by the centrifugal force in the course of winding the resin-adhering fiber bundle on the rotating liner.

(2) In the manufacturing method of the above aspect, the winding process may wind the resin-adhering fiber bundle on the liner to form a reinforcement layer on an outer circumference of the liner. The cooling process may cool down both the resin-adhering fiber bundle that forms an inner layer portion of the reinforcement layer and the resin-adhering fiber bundle that forms an outer layer portion of the reinforcement layer.

This configuration suppresses the resin adhering to the resin-adhering fiber bundle from being splashed in the course of winding both the resin-adhering fiber bundle that forms the inner layer portion of the reinforcement layer and the resin-adhering fiber bundle that forms the outer layer portion of the reinforcement layer, on the rotating liner.

(3) In the manufacturing method of the above aspect, the cooling process may cool clown a joint roller that is configured to feed the resin-adhering fiber bundle to the liner and thereby cool down the resin-adhering fiber bundle via the cooled joint roller.

This configuration readily cools down the resin-adhering fiber bundle, such as to cause the temperature of the resin-adhering fiber bundle before being wound on the liner to be not higher than the temperature that prevents the resin from being splashed in the course of winding the resin-adhering fiber bundle on the liner.

(4) In the manufacturing method of the above aspect, the cooling process may cause a cooling medium to flow inside of the joint roller, so as to cool down the joint roller.

This configuration causes the joint roller to be directly exposed to the cooling medium and to be cooled down. This ensures the quick temperature regulation of the resin-adhering fiber bundle.

(5) In the manufacturing method of the above aspect, the cooling process may cool down the resin-adhering fiber bundle that is wound on a bobbin from which the resin-adhering fiber bundle is wound off.

This configuration also readily cools down the resin-adhering fiber bundle, such as to cause the temperature of the resin-adhering fiber bundle before being wound on the liner to be not higher than the temperature that prevents the resin from being splashed in the course of winding the resin-adhering fiber bundle on the liner.

(6) In the manufacturing method of the above aspect, the cooling process may detect a temperature of the resin-adhering fiber bundle that is to be fed to the liner, and may regulate a degree of cooling the resin-adhering fiber bundle, based on the detected temperature.

This configuration controls the temperature of the resin-adhering fiber bundle with high accuracy, such as to cause the temperature of the resin-adhering fiber bundle before being wound on the liner to be not higher than the temperature that prevents the resin from being splashed in the course of winding the resin-adhering fiber bundle on the liner.

(7) In the manufacturing method of the above aspect, the set temperature may be a temperature of not higher than 30° C. This configuration causes the temperature of the resin-adhering fiber bundle to be not higher than 30° C. in the course of winding the resin-adhering fiber on the liner. This configuration accordingly suppresses the resin adhering to the resin-adhering fiber bundle from being splashed by the centrifugal force the course of winding the resin-adhering fiber bundle on the rotating liner.

(8) According to another aspect of the invention, there is provided a tank manufacturing apparatus. The tank manufacturing apparatus comprises a fiber bundle supplier that is configured to supply a resin-adhering fiber bundle that has a resin adhering to a fiber bundle; a cooling assembly that is configured to cool down the resin-adhering fiber bundle supplied from the fiber bundle supplier; and a fiber winding assembly that is configured to wind the resin-adhering fiber bundle that is cooled down by the cooling assembly, on a rotating liner. The cooling assembly cools down the resin-adhering fiber bundle to make a temperature of the resin-adhering fiber bundle that is being wound on the liner by the fiber winding assembly equal to or lower than a set temperature which is set in advance as a temperature to provide a viscosity of the resin that prevents the resin from being splashed from the resin-adhering fiber bundle by rotation of the liner in a course of winding the resin-adhering fiber bundle on the liner.

In the tank manufacturing apparatus of this aspect, the resin adhering to the resin-adhering fiber bundle that is to be wound on the liner is cooled down by the cooling assembly to have the viscosity increased to the level that prevents the resin from being splashed by rotation of the liner. This configuration suppresses the resin adhering to the resin-adhering fiber bundle from being splashed by the centrifugal force in the course of winding the resin-adhering fiber bundle on the rotating liner.

(9) In the tank manufacturing apparatus of the above aspect, the fiber winding assembly may wind the resin-adhering fiber bundle on the liner to form a reinforcement layer on an outer circumference of the liner. The cooling assembly may cool down both the resin-adhering fiber bundle that forms an inner layer portion of the reinforcement layer and the resin-adhering fiber bundle that forms an outer layer portion of the reinforcement layer.

This configuration suppresses the resin adhering to the resin-adhering fiber bundle from being splashed in the course of winding both the resin-adhering fiber bundle that forms the inner layer portion of the reinforcement layer and the resin-adhering fiber bundle that forms the outer layer portion of the reinforcement layer, on the rotating liner.

(10) In the tank manufacturing apparatus of the above aspect, the fiber winding assembly may comprise a joint roller that is configured to feed the resin-adhering fiber bundle to the liner. The cooling assembly may cool down the joint roller and thereby cool down the resin-adhering fiber bundle via the cooled joint roller.

This configuration readily cools down the resin-adhering fiber bundle, such as to cause the temperature of the resin-adhering fiber bundle before being wound on the liner to be not higher than the temperature that prevents the resin from being splashed in the course of winding the resin-adhering fiber bundle on the liner.

(11) In the tank manufacturing apparatus of the above aspect, the cooling assembly may cause a cooling medium to flow inside of the joint roller, so as to cool down the joint roller.

This configuration causes the joint roller to be directly exposed to the cooling medium and to be cooled down. This ensures the quick temperature regulation of the resin-adhering fiber bundle.

(12) In the tank manufacturing apparatus of the above aspect, the fiber bundle supplier may comprise a bobbin from which the resin-adhering fiber bundle is wound off. The cooling assembly may cool down the resin-adhering fiber bundle that is wound on the bobbin.

This configuration also readily cools down the resin-adhering fiber bundle, such as to cause the temperature of the resin-adhering fiber bundle before being wound on the liner to be not higher than the temperature that prevents the resin from being splashed in the course of winding the resin-adhering fiber bundle on the liner.

(13) The tank manufacturing apparatus of the above aspect may further comprise a temperature detector that is configured to detect a temperature of the resin-adhering fiber bundle that is to be fed to the liner; and a controller that is configured to control the cooling assembly to regulate a degree of cooling the resin-adhering fiber bundle, based on the temperature detected by the temperature detector.

This configuration controls the temperature of the resin-adhering fiber bundle with high accuracy: such as to cause the temperature of the resin-adhering fiber bundle before being wound on the liner to be not higher than the temperature that prevents the resin from being splashed in the course of winding the resin-adhering fiber bundle on the liner.

The invention may be implemented by any of various aspects other than those described above, for example, a winding method of winding a resin-adhering fiber bundle on a liner, a filament winding apparatus, a control method of a tank manufacturing apparatus, a computer program that is configured to implement the control method., and a non-transitory storage medium in which the computer program is stored.

DETAILED DESCRIPTION

A. First Embodiment

Figure 1:
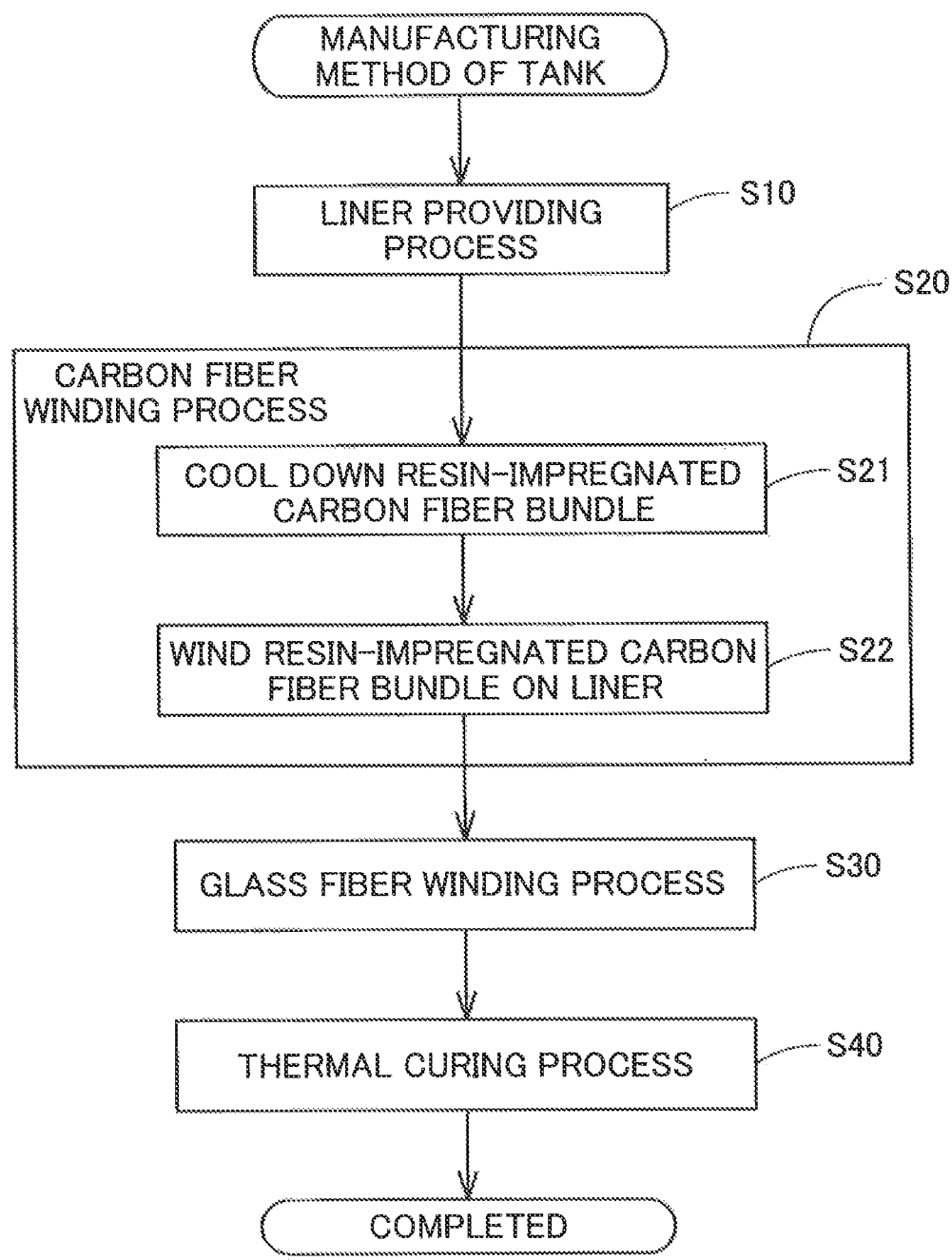
FIG. 1 is a flowchart showing a procedure of a manufacturing method of a tank according to a first embodiment.

FIG. 1 is a flowchart showing a procedure of a manufacturing method of a tank according to a first embodiment. This manufacturing method employs the filament winding method (FW method) to manufacture a high-pressure tank configured to store a high-pressure fluid such as high-pressure hydrogen or high-pressure natural gas. The manufacturing method first provides a liner as a core member to form the shape of a molded product at a liner providing process of step S10. The liner is a hollow container that constitutes a main body of the high-pressure tank. The liner includes a cylinder portion in an approximately cylindrical shape and dome portions in an approximately hemispherical shape provided on the respective sides of the cylinder portion, although not being specifically illustrated. The liner may be made of for example, a hard plastic material. The liner may be provided as a tube having the size corresponding to the inner diameter of the tank.

The manufacturing method subsequently winds a carbon fiber bundle comprised of a plurality of carbon fibers, on the provided liner at a carbon fiber winding process of step S20. Winding the carbon fibers forms a reinforcement layer of carbon fibers on the outer circumference of the liner. A filament winding apparatus (shown in FIG. 2) is used for winding the carbon fiber bundle on the liner. The carbon fiber winding process of this embodiment includes a cooling process of cooling down a resin-impregnated carbon fiber bundle 700 described later (step S21) and a winding process of winding the cooled resin-impregnated carbon fiber bundle 700 on the liner (step S22). A method of cooling down the resin-impregnated carbon fiber bundle 700 will be described later. The cooling process of this embodiment includes an inner layer portion cooling process of cooling down the resin-impregnated carbon fiber bundle 700 that forms an inner layer portion of the reinforcement layer of carbon fibers and an outer layer portion cooling process of cooling down the resin-impregnated carbon fiber bundle 700 that forms an outer layer portion of the reinforcement layer.

After winding the carbon fibers on the liner, the manufacturing method winds glass fibers impregnated with a resin on the liner having the carbon fibers wound on the outer surface thereof (step S30). After winding the glass fibers, the manufacturing method processes the liner having the glass fibers wound on the outer side of the carbon fibers by a thermal curing process (step S40). For example, the thermal curing process may heat the liner having the carbon fibers and the glass fibers wound thereon in a heating furnace. The thermal curing process cures the resins which the carbon fibers and the glass fibers wound on the outer circumference of the liner are impregnated with, so as to provide a fiber-reinforced resin composite product. Components such as mouthpieces may be attached to the liner before winding the carbon fiber bundle at step S20 or may be attached to the fiber-reinforced resin composite product after the thermal curing process. This series of processes completes the high-pressure tank.

Figure 2:
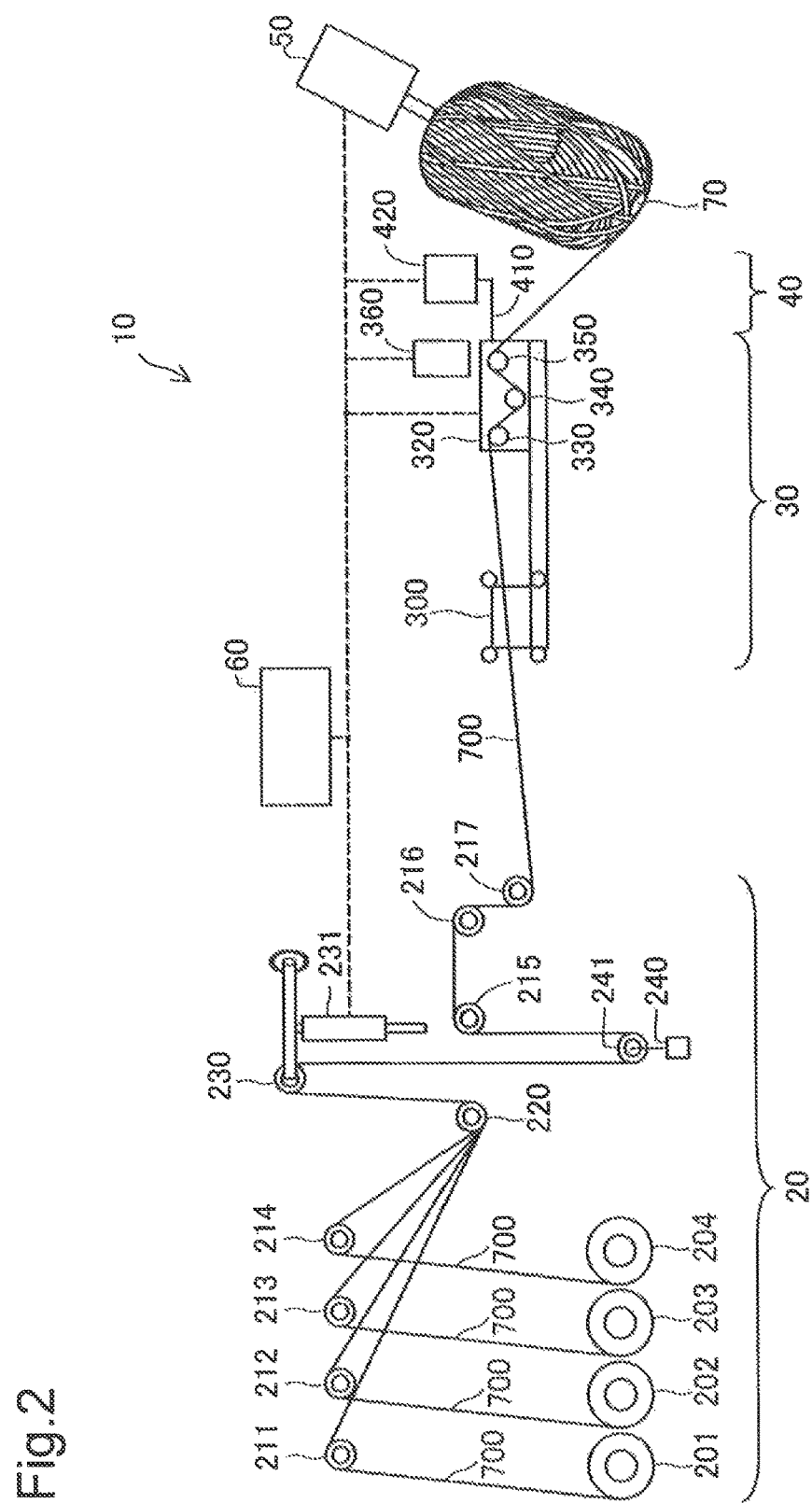
FIG. 2 is a diagram illustrating the configuration of a filament winding apparatus according to the first embodiment.

FIG. 2 is a diagram illustrating the configuration of a filament winding apparatus 10 according to the first embodiment. The filament winding apparatus 10 performs the cooling process (step S21) and the winding process (step S22) described above. The filament winding apparatus 10 includes a fiber wind-off assembly 20, a joint guide assembly 30, a cooling assembly 40, a liner rotating device 50 and a controller 60. The fiber wind-off assembly 20 corresponds to the "fiber bundle supplier". The joint guide assembly 30 and the liner rotating device 50 correspond to the "fiber winder".

The fiber wind-off assembly 20 is a mechanism configured to wind off the carbon fibers and includes a plurality of bobbins 201 to 204, a plurality of feed rollers 211 to 217, a bundle roller 220, a tension roller 230 and an active dancer 240. The bobbins 201 to 204 are tubular members for winding yarns, and resin-impregnated carbon fiber bundles 700 are wound on the respective bobbins 201 to 204. The resin-impregnated carbon fiber bundle 700 is a prepreg that has a carbon fiber bundle impregnated with a thermosetting epoxy resin. The carbon fiber bundle may be, for example, a flat sheet of about 200 μm thickness and about 4 mm to 5 mm in width produced by firing polyacrylonitrile raw yarns at about 3000° C., collectively twisting about 24,000 fired yarns and making the twisted yarns lightly adhere to one another with a binder resin. The feed rollers 211 to 214 are provided corresponding to the respective bobbins 201 to 204 to feed the resin-impregnated carbon fiber bundles 700 wound off from the bobbins 201 to 204 to the bundle roller 220. The bundle roller 220 aligns the resin-impregnated carbon fiber bundles 700 wound off from the bobbins 201 to 204 and winds off the aligned resin-impregnated carbon fiber bundles 700 to the tension roller 230. The tension roller 230 includes a cylinder 231 that is set to have a predetermined pressure, and applies a predetermined tensile force to the resin-impregnated carbon fiber bundles 700. The active dancer 240 moves a roller 241 to adjust the tensile force of the resin-impregnated carbon fiber bundles 700. The resin-impregnated carbon fiber bundles 700 of the adjusted tensile force are conveyed through the feed rollers 215 to 217 to the joint guide assembly 30.

The joint guide assembly 30 is a mechanism configured to align the resin-impregnated carbon fiber bundles 700 and guide the aligned resin-impregnated carbon fiber bundles 700 to the outer surface of the liner 70 and includes an alignment port 300, a fiber feeder 320 and a temperature detector 360. The alignment port 300 collects, arrays and aligns the resin-impregnated carbon fiber bundles 700 in the width direction. The fiber feeder 320 includes a first joint roller 330, a second joint roller 340 and a third joint roller 350 and uses these three joint rollers 330 to 350 to convey the resin-impregnated carbon fiber bundle 700 to the liner 70. According to this embodiment, the resin-impregnated carbon fiber bundle 700 enters from the first joint roller 330-side and is guided to the liner 70 while sequentially coming into contact with the upper outer circumference of the first joint roller 330, the lower outer circumference of the second joint roller 340 and the upper outer circumference of the third joint roller 350. The temperature detector 360 may be configured by, for example a radiation thermometer to detect the temperature of the resin-impregnated carbon fiber bundle 700. Hereinafter the temperature detected by the temperature detector 360 is referred to as "detected temperature Td".

The cooling assembly 40 is a mechanism configured to cool down the resin-impregnated carbon fiber bundle 700 and includes a cooling medium cooling unit 420 and a cooling medium flow path 410. The cooling medium cooling unit 420 may be configured to include, for example, a radiator and a compressor and to change the circulation rate (flow rate) of a cooling medium for example, water) under control by the controller 60. The cooling medium flow path 410 is arranged to circulate the cooling medium, such that the cooling medium cooled down by the cooling medium cooling unit 420 is made to flow inside of the three joint rollers 330 to 350 of the fiber feeder 320 and that the cooling medium flowing inside of the joint rollers 330 to 350 is fed to the cooling medium cooling unit 420. As described above, the cooling assembly 40 of this embodiment is configured to cool down the three joint rollers 330 to 350 and thereby cool down the resin-impregnated carbon fiber bundle 700 via the joint rollers 330 to 350. The joint rollers 330 to 350 are directly exposed to the cooling medium to be cooled down. This ensures quick temperature regulation of the resin-impregnated carbon fiber bundle 700. The specific configuration of the cooling assembly 40 will be described later.

The liner rotating device 50 supports the liner 70 in a rotatable manner and rotates the liner 70 around a longitudinal axis of the liner 70. The liner rotating device 50 rotates the liner 70 to wind the resin-impregnated carbon fiber bundle 700 on the liner 70 with applying a tensile force to the resin-impregnated carbon fiber bundle 700. The resin-impregnated carbon fiber bundle 700 is accordingly wound on the surface of the liner 70 by combination of hoop winding and helical winding. This forms a reinforcement layer of carbon fibers around the outer circumference of the liner 70.

The controller 60 controls the cooling medium cooling unit 420 to regulate the flow rate of the cooling medium, based on the temperature of the resin-impregnated carbon fiber bundle 700 detected by the temperature detector 360 (detected temperature Td). The controller 60 may also control the operation of the active dancer 240, the move of the fiber feeder 320, and the move and rotation of the liner 70. The controller 60 may be configured to control the rotation speed of the liner rotating device 50 according to the tensile force of the resin-impregnated carbon fiber bundle 700.

Figure 3:
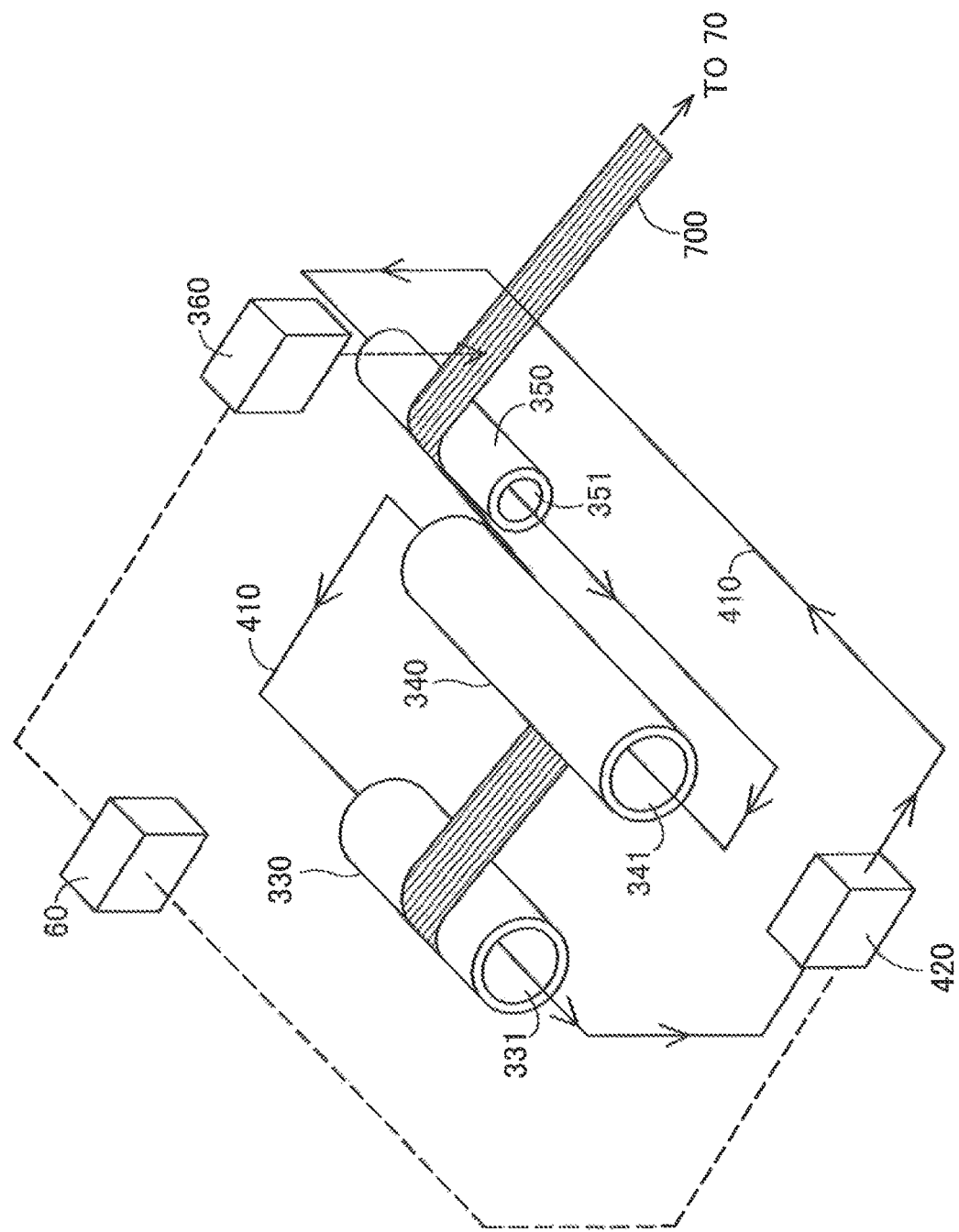
FIG. 3 is a diagram illustrating the configuration of a cooling assembly.

FIG. 3 is a diagram illustrating the configuration of the cooling assembly 40. FIG. 3 illustrates the three joint rollers 330 to 350 of the fiber feeder 320 and the temperature detector 360, as well as the cooling assembly 40. The three joint, rollers 330 to 350 of this embodiment respectively have inner conduits 331, 341 and 351 to constitute part of the cooling medium flow path 410. The cooling medium flow path 410 is arranged such that the cooling medium cooled down by the cooling medium cooling unit 420 sequentially flows through the conduits 331, 341 and 351. The resin-impregnated, carbon fiber bundle 700 sequentially comes into contact with the upper outer circumference, the lower outer circumference and the upper outer circumference of the cooled three joint rollers 330, 340 and 350 to be cooled down.

The controller 60 of the embodiment performs feedback control to regulate the flow rate of the cooling medium, in order to make the detected temperature Td, which denotes the temperature of the resin-impregnated carbon fiber bundle 700 that is being wound on the liner 70, equal to or lower than a set temperature Tp. The "set temperature Tp" herein is a temperature set in advance to provide a viscosity of the resin that prevents the resin from being splashed from the resin-impregnated carbon fiber bundle 700 by rotation of the liner 70 in the course of winding the resin-impregnated carbon fiber bundle 700 on the liner 70. The set temperature Tp is preferably not higher than 30° C. and is more preferably not higher than 20° C. The resin-impregnated carbon fiber bundle 700 at the temperature of not higher than 30° C. causes the resin adhering to the resin-impregnated carbon fiber bundle 700 to have a sufficiently high viscosity that prevents the resin from being splashed by rotation of the liner 70. This suppresses the resin, adhering to the resin-impregnated carbon fiber bundle 700 from being splashed by the centrifugal, force in the course of winding the resin-impregnated carbon fiber bundle 700 on the rotating liner 70. The set temperature Tp may not be a fixed value but may be set to be varied according to the rotation speed of the liner. According to this embodiment, the controller 60 controls the cooling medium cooling unit 420 to cool down both the resin-impregnated carbon fiber bundle 700 that forms the inner layer portion of the reinforcement layer of carbon fibers and the resin-impregnated carbon fiber bundle 700 that forms the outer layer portion of the reinforcement layer.

Figure 4A:
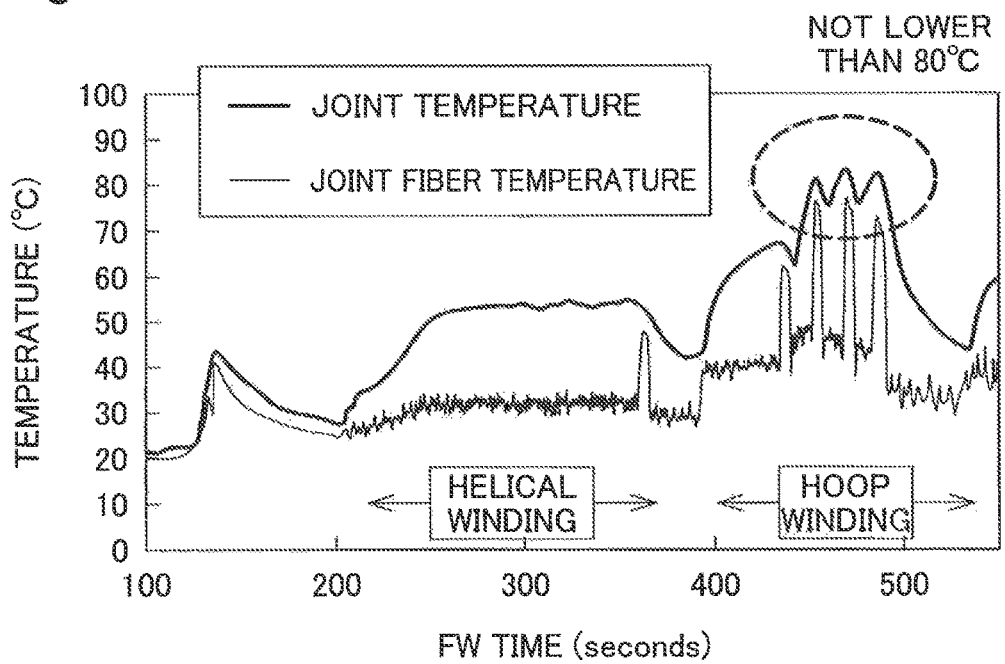
FIG. 4A illustrates relationships of joint temperature and joint fiber temperature to time period when a resin-impregnated carbon fiber bundle is wound on a liner.
Figure 4B:
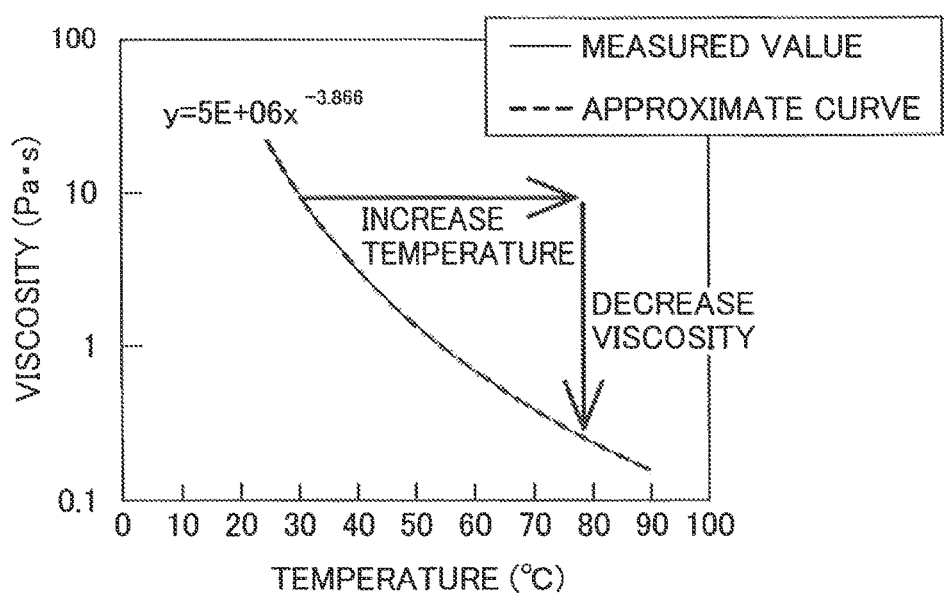
FIG. 4B illustrates a relationship of viscosity to temperature of the resin included in the resin-impregnated carbon fiber bundle.

FIGS. 4A and 4B are diagrams illustrating a relationship between temperature of the resin-impregnated carbon fiber bundle 700 and viscosity of the resin included in the resin-impregnated carbon fiber bundle 700. FIG. 4A illustrates relationships of joint temperature and joint fiber temperature to time period when the resin-impregnated carbon fiber bundle 700 is wound on the liner 70 (FW time). The "joint temperature" herein denotes the temperature of the joint rollers 330 to 350, and the "joint fiber temperature"

herein denotes the detected temperature Td. FIG. 4B illustrates a relationship of viscosity to temperature of the resin included in the resin-impregnated carbon fiber bundle 700. As shown in FIG. 4A, the resin-impregnated carbon fiber bundle 700 that is to be wound on the liner 70 has the temperature (joint fiber temperature) increased by, for example, friction against the joint rollers 330 to 350. Increasing the temperature of the resin-impregnated carbon fiber bundle 700 leads to decreasing the viscosity of the resin included in the resin-impregnated carbon fiber bundle 700 as shown in FIG. 4B. Decreasing the viscosity of the resin included in the resin-impregnated carbon fiber bundle 700 is likely to cause the resin adhering to the resin-impregnated carbon fiber bundle 700 to be splashed by rotation of the liner 70 in the course of winding the resin-impregnated carbon fiber bundle 700 on the liner 70. According to this embodiment, on the other hand, the resin-impregnated carbon fiber bundle 700 that is to be wound on the liner 70 is cooled down to be not higher than the set temperature Tp by the cooling assembly. This increases the viscosity of the resin included in the resin-impregnated carbon fiber bundle 700 to the level that prevents the resin from being splashed by rotation of the liner 70.

As described above, in the manufacturing method of the tank according to this embodiment, the resin-impregnated carbon fiber bundle 700 that is to be wound on the liner 70 is cooled down to the temperature of not higher than the set temperature Tp by the cooling process of FIG. 1 (step S21). This suppresses the resin from being splashed from the resin-impregnated carbon fiber bundle 700 wound on the liner 70 in the course of rotation of the liner 70. Recently there has been a demand for increasing the rotation speed of the liner with a view to enhancing the efficiency of manufacturing the tank increasing the rotation speed of the liner leads to increasing the splash amount of the resin splashed from the resin-impregnated carbon fiber bundle 700 wound on the liner 70. The splashed resin is likely to invade the various mechanisms of the filament winding apparatus and is also likely to adversely affect the human body. The configuration of this embodiment suppresses the splash of the resin and thereby suppresses the occurrence of these problems. The configuration of this embodiment also allows for increasing the rotation speed of the liner, thus enhancing the manufacturing efficiency.

B. Second Embodiment

Figure 5:
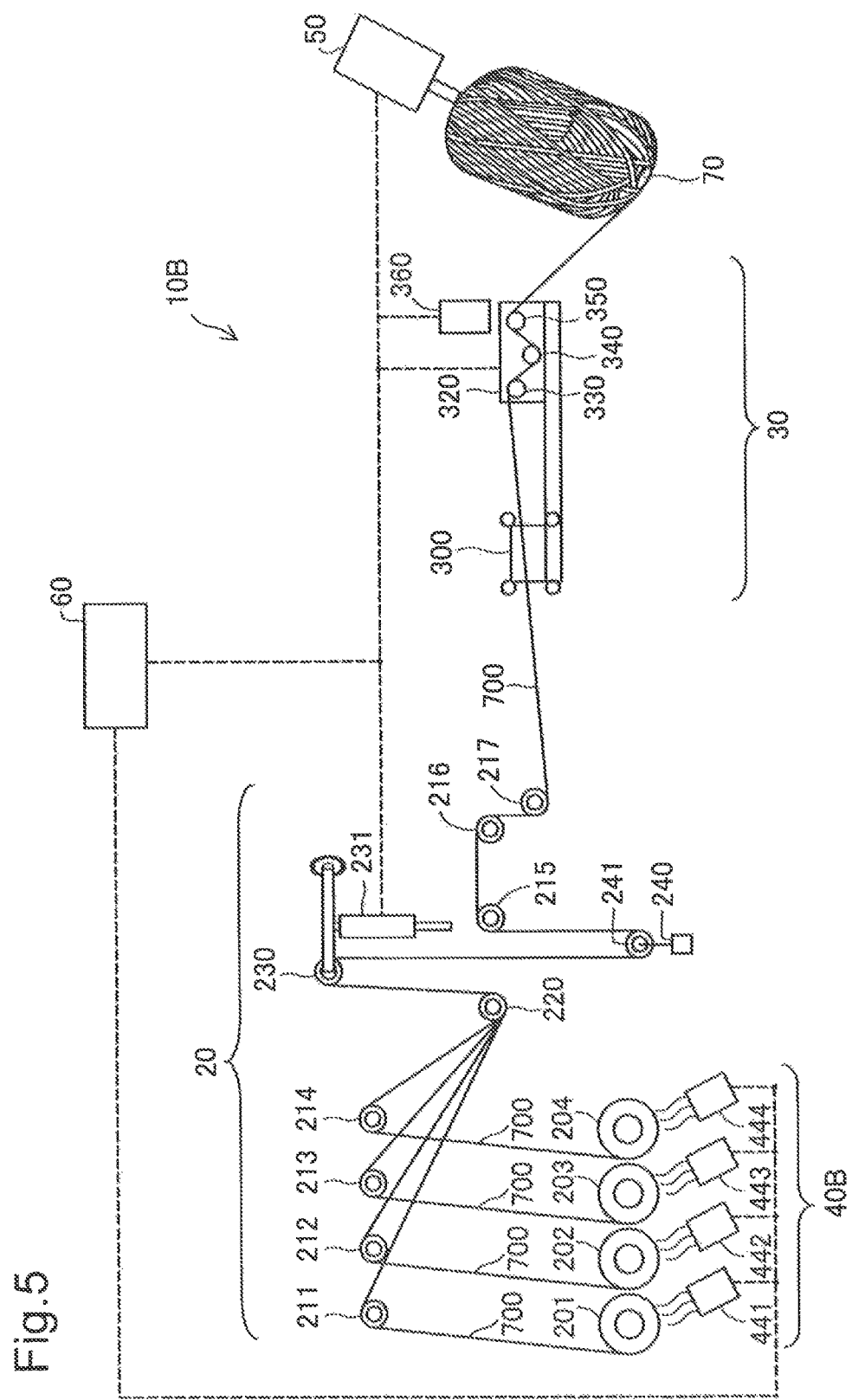
FIG. 5 is a diagram illustrating the configuration of a filament winding apparatus according to a second embodiment.

FIG. 5 is a diagram illustrating the configuration of a filament winding apparatus 10B according to a second embodiment The filament winding apparatus 10B of the second embodiment differs from the filament winding apparatus 10 of the first embodiment (shown in FIG. 2) by the position of a cooling assembly provided to cool down the resin-impregnated carbon fiber bundle 700. In the filament winding apparatus 10B of the second embodiment, a cooling assembly 40B is placed not in the joint, guide assembly 30 but in the fiber wind-off assembly 20. The cooling assembly 40B includes a plurality of blowers 441, 442, 443 and 444. The blowers 441 to 444 are provided corresponding to the respective bobbins 201 to 204 to cool down the resin-impregnated carbon fiber bundles 700 wound on the respective bobbins 201 to 204. The blowers 441 to 444 are configured to change at least one of the blast volume and the blast temperature under control by the controller 60. The controller 60 performs feedback control to regulate at least one of the blast volume and the blast temperature of the blowers 441 to 444, in order to make the temperature of the resin-impregnated carbon fiber bundle 700 detected by the temperature detector 360 (detected temperature Td) equal to or lower than the set temperature Tp. This configuration also makes the temperature of the resin-impregnated carbon fiber bundle 700 that is to be wound on the liner 70 equal to or lower than the set temperature Tp and thereby suppresses the resin from being splashed from the resin-impregnated carbon fiber bundle 700 wound on the liner 70 in the course of rotation of the liner 70.

C. Third Embodiment

Figure 6:
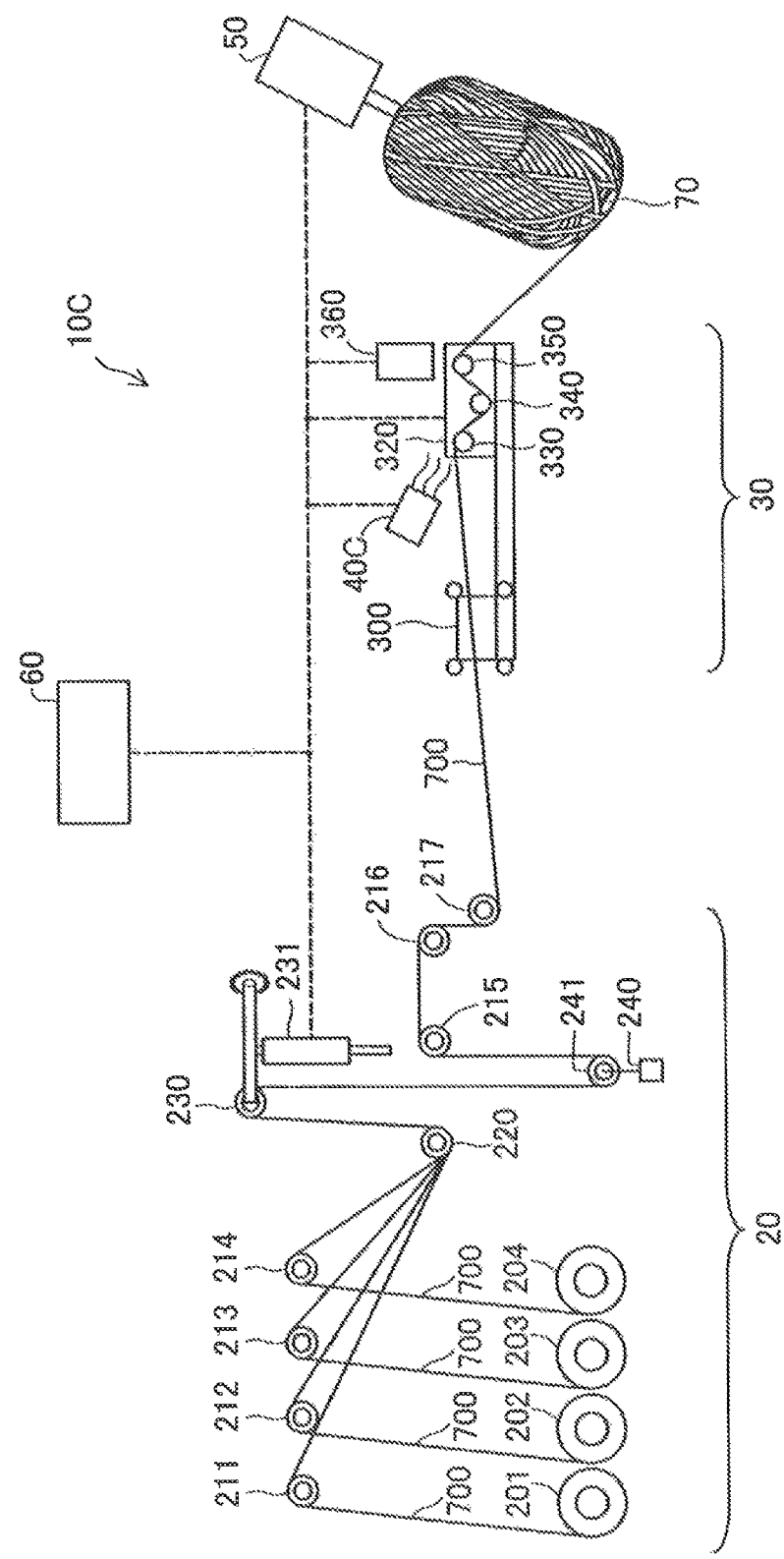
FIG. 6 is a diagram illustrating the configuration of a filament winding apparatus according to a third embodiment.

FIG. 6 is a diagram illustrating the configuration of a filament winding apparatus 10C according to a third embodiment. The filament winding apparatus 10C of the third embodiment differs from the filament winding apparatus 10 of the first embodiment (shown in FIG. 2) by the method of cooling down the resin-impregnated carbon fiber bundle 700. In the filament winding apparatus 10C of the third embodiment, a cooling assembly 40C is constituted as a blower. The cooling assembly 40C is provided to cool down the resin-impregnated carbon fiber bundle 700 conveyed through the three joint rollers 330 to 350 of the fiber feeder 320. The cooling assembly 40C is configured to change at least one of the blast volume and the blast temperature under control by the controller 60. The controller 60 performs feedback control to regulate at least one of the blast volume and the blast temperature of the cooling assembly 40C, in order to make the temperature of the resin-impregnated carbon fiber bundle 700 detected by the temperature detector 360 (detected temperature Td) equal to or lower than the set temperature Tp. This configuration also makes the temperature of the resin-impregnated carbon fiber bundle 700 that is to be wound on the liner 70 equal to or lower than the set, temperature Tp and thereby suppresses the resin from being splashed from the resin-impregnated carbon fiber bundle 700 wound on the liner 70 in the course of rotation of the liner 70.

D. Modifications

The invention is not limited to the embodiments described above but may be implemented by a diversity of other configurations without departing from the scope of the invention. Some examples of possible modification are given below.

D-1. Modification 1

In the above embodiment (shown in FIG. 1), the cooling process (step S21) and the winding process (step S22) are performed in the carbon fiber winding process (step S20). According to a modification, these steps (steps S21 and S22) may be applied to the glass fiber winding process (step S30). More specifically, the cooling method of the embodiment may be employed to cool down a resin-impregnated glass fiber bundle that is to be wound on the liner having the reinforcement layer of carbon fibers formed on the outer surface thereof. This modified configuration suppresses the splash of the resin in the glass fiber winding process.

D-2. Modification 2

The configurations of the filament winding apparatuses of the first to the third embodiments may be combined appropriately. For example, the filament winding apparatus 10 of the first embodiment may include the cooling assembly 40B of the second embodiment, in addition to the cooling assembly 40. The configurations of the filament winding apparatuses of the first to the third embodiments may be changed and modified appropriately For example, in the filament winding apparatus 10 of the first embodiment, at least one of the three joint rollers 330 to 350 of the fiber feeder 320 may be configured not to be cooled down by the cooling assembly 40. In another example, in the filament winding apparatus 10C of the third embodiment, the cooling assembly 40C may include a plurality of blowers. In another example, the temperature detector 360 may be configured to detect the temperature of the resin-impregnated carbon fiber bundle 700 before being conveyed to the fiber feeder 320. In this modified configuration, the temperature of the resin-impregnated carbon fiber bundle 700 that is conveyed through the fiber feeder 320 to the liner 70 may be estimated from the detected temperature of the resin-impregnated carbon fiber bundle 700 before being conveyed to the fiber feeder 320.

D-3. Modification 3

The surfaces of the three joint rollers 330 to 350 of the fiber feeder 320 which the resin-impregnated carbon fiber bundle 700 comes into contact with may be Teflon coated. This reduces the friction of the resin-impregnated carbon fiber bundle 700 against the surfaces of the three joint rollers 330 to 350 and thereby suppresses a temperature rise of the resin-impregnated carbon fiber bundle 700. Suppressing the temperature rise of the resin-impregnated carbon fiber bundle 700 leads to suppressing a decrease in the viscosity of the resin included in the resin-impregnated carbon fiber bundle 700, thus further suppressing the resin from being splashed from the resin-impregnated carbon fiber bundle 700 wound on the liner 70.

D-4. Modification 4

In the embodiments described above, the resin-impregnated carbon fiber bundles 700 are wound on the respective bobbins 201 to 204. According to a modification, dry carbon fiber bundles that are not impregnated with the resin may be wound on the respective bobbins 201 to 204. In this case, the resin-impregnated carbon fiber bundle 700 may be obtained, for example, by soaking the dry carbon fiber bundle in a thermosetting epoxy resin in a resin impregnation tank. A resin-adhering carbon fiber bundle may be obtained, for example, by bonding a resin sheet to the dry carbon fiber bundle.

What is claimed is:

1. A manufacturing method of a tank, comprising:
   a cooling process of cooling down a resin-adhering fiber bundle that has a resin adhering to a fiber bundle; and
   a winding process of winding the resin-adhering fiber bundle that is cooled down by the cooling process, on a rotating liner,
   wherein the cooling process cools down the resin-adhering fiber bundle to make a temperature of the resin-adhering fiber bundle equal to or lower than a set temperature prior to the resin-adhering fiber bundle being wound on the rotating liner, the set temperature being set in advance as a temperature to provide a viscosity of the resin that prevents the resin from being splashed from the resin-adhering fiber bundle by rotation of the liner in a course of winding the resin-adhering fiber bundle on the liner,
   wherein the winding process winds the resin-adhering fiber bundle on the liner to form a reinforcement layer on an outer circumference of the liner,
   wherein the cooling process cools down both the resin-adhering fiber bundle that forms an inner layer portion of the reinforcement layer and the resin-adhering fiber bundle that forms an outer layer portion of the reinforcement layer, and
   wherein the cooling process cools down both the resin-adhering fiber bundle that forms the inner layer portion of the reinforcement layer and the resin-adhering fiber bundle that forms the outer layer portion of the reinforcement layer by allowing both of the resin-adhering fiber bundles to come into contact alternately with an upper outer circumference and a lower outer circumference of multiple cooled joint rollers.

2. The manufacturing method according to claim 1,
wherein the multiple cooled joint rollers are configured to feed the resin-adhering fiber bundle to the liner, and
wherein the cooling process cools down the multiple cooled joint rollers and thereby cools down the resin-adhering fiber bundle via the multiple cooled joint rollers.

3. The manufacturing method according to claim 2,
wherein the cooling process causes a cooling medium to flow inside of the multiple cooled joint rollers, so as to cool down the multiple cooled joint rollers.

4. The manufacturing method according to claim 1,
wherein the cooling process cools down the resin-adhering fiber bundle that is wound on a bobbin from which the resin-adhering fiber bundle is wound off.

5. The manufacturing method according to claim 2,
wherein the cooling process detects a temperature of the resin-adhering fiber bundle that is to be fed to the liner, and regulates a degree of cooling the resin-adhering fiber bundle, based on the detected temperature.

6. The manufacturing method according to claim 1,
wherein the set temperature is a temperature of not higher than 30° C.

7. The manufacturing method according to claim 1, wherein the set temperature is set to be varied according to a rotation speed of the liner.

8. A tank manufacturing apparatus, comprising:
a fiber bundle supplier that is configured to supply a resin-adhering fiber bundle that has a resin adhering to a fiber bundle;
a cooling assembly that is configured to cool down the resin-adhering fiber bundle supplied from the fiber bundle supplier; and
a fiber winding assembly that is configured to wind the resin-adhering fiber bundle that is cooled down by the cooling assembly, on a rotating liner, wherein
the fiber winding assembly winds the resin-adhering fiber bundle on the liner to form a reinforcement layer on an outer circumference of the liner,
the cooling assembly is configured to cool down both the resin-adhering fiber bundle that forms an inner layer portion of the reinforcement layer and the resin-adhering fiber bundle that forms an outer layer portion of the reinforcement layer,
the cooling assembly is configured to cool down the resin-adhering fiber bundle to make a temperature of the resin-adhering fiber bundle equal to or lower than a set temperature prior to the resin-adhering fiber bundle being wound on the rotating liner, the set temperature being set in advance as a temperature to provide a viscosity of the resin that prevents the resin from being splashed from the resin-adhering fiber bundle by rotation of the liner in a course of winding the resin-adhering fiber bundle on the liner, and
the cooling assembly is configured to cool down both the resin-adhering fiber bundle that forms the inner layer portion of the reinforcement layer and the resin-adhering fiber bundle that forms the outer layer portion of the reinforcement layer by allowing both of the resin-adhering fiber bundles to come into contact alternately with an upper outer circumference and a lower outer circumference of multiple cooled joint rollers.

9. The tank manufacturing apparatus according to claim 8,
wherein the multiple cooled joint rollers are configured to feed the resin-adhering fiber bundle to the liner; and
wherein the cooling assembly is configured to cool down the multiple cooled joint rollers and thereby cool down the resin-adhering fiber bundle via the multiple cooled joint rollers.

10. The tank manufacturing apparatus according to claim 9,
wherein the cooling assembly causes a cooling medium to flow inside of the multiple cooled joint rollers, so as to cool down the multiple cooled joint rollers.

11. The tank manufacturing apparatus according to claim 8,
wherein the fiber bundle supplier comprises a bobbin from which the resin-adhering fiber bundle is wound off, and
the cooling assembly is configured to cool down the resin-adhering fiber bundle that is wound on the bobbin.

12. The tank manufacturing apparatus according to claim 9, further comprising:
a temperature detector that is configured to detect a temperature of the resin-adhering fiber bundle that is to be fed to the liner; and
a controller that is configured to control the cooling assembly to regulate a degree of cooling the resin-adhering fiber bundle, based on the temperature detected by the temperature detector.

13. The tank manufacturing apparatus according to claim 8, wherein the set temperature is set to be varied according to a rotation speed of the liner.

* * * * *